United States Patent
Spoonhower et al.

(10) Patent No.: US 6,879,306 B2
(45) Date of Patent: Apr. 12, 2005

(54) SCANNED DISPLAY SYSTEMS USING COLOR LASER LIGHT SOURCES

(75) Inventors: John P. Spoonhower, Webster, NY (US); Keith B. Kahen, Rochester, NY (US); John A. Lebens, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 273 days.

(21) Appl. No.: 10/137,761

(22) Filed: May 2, 2002

(65) Prior Publication Data

US 2003/0206145 A1 Nov. 6, 2003

(51) Int. Cl.[7] .................. G09G 3/34; G02F 1/3339; H01S 5/00; H01L 21/00
(52) U.S. Cl. .................. 345/84; 345/44; 345/87; 349/155; 349/156; 372/40; 372/43; 372/70; 372/99; 372/45; 372/46; 372/48; 438/22; 438/28; 438/34; 438/35; 438/42; 438/43
(58) Field of Search ............. 372/40, 43–50, 372/70–72, 99; 438/22–47; 345/87, 44, 84; 348/744

(56) References Cited

U.S. PATENT DOCUMENTS

| | | | | |
|---|---|---|---|---|
| 4,881,236 A | * | 11/1989 | Brueck et al. ............ | 372/45 |
| 5,052,016 A | * | 9/1991 | Mahbobzadeh et al. ...... | 372/45 |
| 5,381,502 A | | 1/1995 | Veligdan | |
| 5,548,610 A | * | 8/1996 | Bouadma et al. ............ | 372/99 |
| 5,625,202 A | * | 4/1997 | Chai ........................ | 257/94 |
| 5,796,771 A | * | 8/1998 | DenBaars et al. ............ | 372/75 |
| 6,160,828 A | * | 12/2000 | Kozlov et al. ................ | 372/39 |
| 6,194,119 B1 | | 2/2001 | Wolk et al. | |
| 6,263,002 B1 | * | 7/2001 | Hsu et al. ..................... | 372/6 |
| 6,304,237 B1 | | 10/2001 | Karakawa | |
| 6,330,262 B1 | * | 12/2001 | Burrows et al. ............. | 372/39 |
| 6,392,733 B1 | * | 5/2002 | Gregory ..................... | 349/146 |
| 6,594,090 B2 | * | 7/2003 | Kruschwitz et al. ........ | 359/707 |
| 6,683,898 B2 | * | 1/2004 | Østergaard et al. ........... | 372/43 |
| 6,775,000 B2 | * | 8/2004 | Harrison et al. ............ | 356/432 |
| 2001/0022566 A1 | | 9/2001 | Okazaki | |
| 2001/0043636 A1 | * | 11/2001 | Bewley et al. ............... | 372/70 |
| 2002/0009274 A1 | | 1/2002 | Gharavi et al. | |

FOREIGN PATENT DOCUMENTS

EP 1081816 A2 * 3/2001 ........... H01S/5/183

OTHER PUBLICATIONS

"Design of Fabry–Perot Surface–Emitting Lasers with a Periodic Gain Structure", by Scott W. Cozine et al., IEE Journal of Quantum Electronics, vol. 25, No. 6, Jun. 1989, pp. 1513–1524.

"Transform–Limited, Narrow–Linewidth Lasing Action in Organic Semiconductor Microcavities" by V. Bulovic et al., vol. 279, XP–000962029, Jan. 23, 1998, pp. 553–555, ISSN: 0036–8075.

"Lasing From Conjugated–Polymer Microcavities", by N. Tessler et al., XP–002102379, vol. 382, No. 6593, Aug. 22, 1996, pp. 695–697.

\* cited by examiner

*Primary Examiner*—Henry N. Tran
*Assistant Examiner*—Peter Prizio, Jr.
(74) *Attorney, Agent, or Firm*—Raymond L. Owens (57) ABSTRACT

A display system for providing a user viewable visible color image includes a display for receiving color laser light so that the display, in response to color laser light, produces a viewable visible colored image; a plurality of different color laser light sources arranged in an array with each such laser light source including: a first dielectric stack for receiving and transmitting pump-beam light and being reflective to laser light over a predetermined range of wavelengths; an organic active region for receiving transmitted pump-beam light from the first dielectric stack; and a second dielectric stack for reflecting transmitted pump-beam light and laser light from the organic active region back into the organic active region. The display system projects color laser light from the array onto the display in a pattern to cause a visual image to be produced by the display.

8 Claims, 5 Drawing Sheets

SCANNED DISPLAY SYSTEMS USING COLOR LASER LIGHT SOURCES

CROSS REFERENCE TO RELATED APPLICATIONS

Reference is made to commonly assigned U.S. patent application Ser. No. 09/832,759 filed Apr. 11, 2001 entitled "Incoherent Light-Emitting Device Apparatus for Driving Vertical Laser Cavity" by Keith B. Kahen et al. and commonly assigned U.S. patent application Ser. No. 10/066,829 filed Feb. 4, 2002 entitled "Organic Vertical Cavity Phase-Locked Laser Array Device" by Keith B. Kahen, the disclosures of which are incorporated herein by reference.

FIELD OF THE INVENTION

The present invention relates to display systems and, more particularly, to display systems that use color laser light sources.

BACKGROUND OF THE INVENTION

While display devices based upon laser light sources have been known for some time, their performance limitations have presented a barrier to many desirable applications. This is especially true for color display applications where the complexity and cost of using readily available, multiple, independent laser devices precludes large acceptance of these devices. Additionally, although lasers are an ideal light source for such applications from an intensity or brightness perspective, the coherence of the laser light generates speckle that is unpleasant to the viewer.

Display devices based on laser light sources depend upon the generation of multiple wavelengths of light in order to produce a color display. The color is created by appropriately mixing such light sources to achieve a high color quality; the measure of the color range is termed the gamut. Three or more different wavelength sources are commonly used to create a high gamut display. These distinct light sources are projected onto a surface from which the content is viewed. Commonly two forms of such projection are used. Front-projection refers to the delivery of the multiple wavelengths of light using an optical system in which the delivery occurs to the front surface of the viewing screen. The screen is observed by the viewer in a reflection mode. Rear-projection refers to the situation in which the light is delivered by an optical system to the rear of the viewing screen. In this instance, the light propagates through the screen and is observed by the viewer in a transmission mode.

In U.S. Patent Publication US 2001/0022566 A1, Okazaki describes the use of three separate lasers to produce the three different wavelengths for a color display. These wavelengths are produced by a variety of inorganic solid state laser devices. These three wavelengths are combined using optical means well known to those versed in the art, and through the use of galvonometer and rotating mirrors, as well as additional optics, an image is produced upon the viewing screen. The color gamut of this display is dictated by the choice of wavelengths available from such solid state laser sources. In turn, these wavelengths are determined by the solid state material properties, including such properties as the solid state alloy composition, dopant type and composition, etc. In this apparatus a small mirror is wobbled to reduce the deleterious effects of speckle for the viewer. Solid state laser sources are preferable for their improved electrical power efficiency, reduced size, and lower cost relative to the more commonly employed gas lasers. Additionally, because this apparatus does not obtain its multiple wavelengths needed for the display by employing nonlinear optical means of wavelength conversion, reduced amplitude noise is claimed for this apparatus.

In U.S. Pat. No. 6,304,237 B1, Karakawa discloses a display apparatus where the three wavelengths for display are produced by a single pulsed laser which is used to produce three different optical wavelength beams by means of nonlinear wavelength conversion. An $Nd:YVO_4$ crystal with laser output at 1064 nm is used to pump a number of different devices to produce three different visible wavelengths suitable for a display system. Wavelengths in the green, red, and blue portions of the spectrum are produced by nonlinear conversion. For example, Second Harmonic Generation (SHG) in an external optical cavity produces the green wavelength at 532 nm. Various other schemes for producing the other visible wavelengths are described including the use of an Optical Parametric Oscillator (OPO) and Sum Frequency Mixing (SFM). Pulsed lasers are used in order to produce the high optical powers required for such nonlinear optical generation schemes, and to meet the brightness requirements for the display. In some instances an etalon is employed in the external optical cavities used to produce the visible radiation. The etalon is used to generate a multi-longitudinal mode output, which results in the reduction of the coherence of the optical beam. In this way, the undesirable effect of speckle is reduced. The increased amplitude noise generally characteristic of pulsed lasers is not mentioned in this document.

In addition to projection systems where the visible laser light is delivered to the viewscreen after free propagation, i.e., propagation through an atmosphere or empty space, there exist display systems using visible laser light in which the light is brought to the viewscreen by waveguide action. In U.S. Pat. No. 5,381,502, Veligdan discloses the use of a planar optical waveguide to deliver the laser light to the viewscreen. In principle, such an apparatus would result in a much thinner display, assuming that the laser light source(s) can be adequately reduced in size.

There are a number of problems with past designs that the current invention overcomes. Inorganic solid state laser devices, although an improvement over gas lasers in terms of cost, reliability, and size, are still costly and relatively large devices, particularly for display applications. This makes the creation of "flat panel" displays based upon these devices difficult to achieve. Clearly it is desirable to reduce the size and complexity of such an apparatus. Furthermore, wavelength selection, in order to realize an optimum color gamut or color range, is limited for inorganic solid state laser sources.

SUMMARY OF THE INVENTION

It is an object of the present invention to provide an improved display system that uses visible laser light sources.

This object is achieved by a display system for providing a user viewable visible color image, comprising:

a) a display for receiving color laser light and having a diffusing element so that the display, in response to color laser light, produces a viewable visible colored image;

b) a plurality of different color laser light sources arranged in an array with each such laser light source including a vertical cavity design having:

i) a first dielectric stack for receiving and transmitting pump-beam light and being reflective to laser light over a predetermined range of wavelengths;

ii) an organic active region for receiving transmitted pump-beam light from the first dielectric stack; and iii) a second dielectric stack for reflecting transmitted pump-beam light and laser light from the organic active region back into the organic active region, wherein a combination of the first and second dielectric stacks and the organic active region produces the laser light; and c) means for projecting color laser light from the array onto the display in a pattern to cause a visual image to be produced by the display.

A feature of the present invention is the use of visible laser devices based upon a vertical cavity design incorporating high reflectance dielectric multilayer mirrors for both the top and bottom dielectric stacks and having the active material composed of small molecular weight organic material. A consequence of the very low threshold for this vertical laser cavity design is that it is unnecessary to use high power density pump-beam devices (focused laser light) in order to cause the organic cavity to laser. As a result, low power density devices, such as that produced by unfocused light emitting diode (LED) radiation, are sufficient light sources to be used for pumping the laser cavities. Combining an organic-based laser cavity with an LED pump source results in an inexpensive and versatile laser light source whose light output can be tuned over a large wavelength range. This enables the fabrication of displays with low cost, high color gamut, reduced complexity, and high reliability, to be produced from a design where the laser light source are scalable and may be patterned.

BRIEF DESCRIPTION OF THE DRAWINGS

In the detailed description of the preferred embodiments of the invention presented below, reference is made to the accompanying drawings.

DETAILED DESCRIPTION OF THE INVENTION

A display system for providing a user viewable visible color image is described that uses LED-pumped organic laser microcavity technology. Microcavity lasers with organic active media (gain media) may be used singly or patterned with necessary drive electronics onto a linear array structure. The microcavity lasers are designed with different organic gain media in order to produce devices that emit light with different visible wavelengths. The linear array length and microcavity laser density are such as to produce a high resolution projection display when the laser light is imaged onto a view surface. A single linear array emitting device is imaged to produce either a row or a column of color pixels in the viewed area. The image of the linear array is scanned across the viewed area by means of a single or multiple scan devices to produce a full image in the viewed area.

Figure 1:
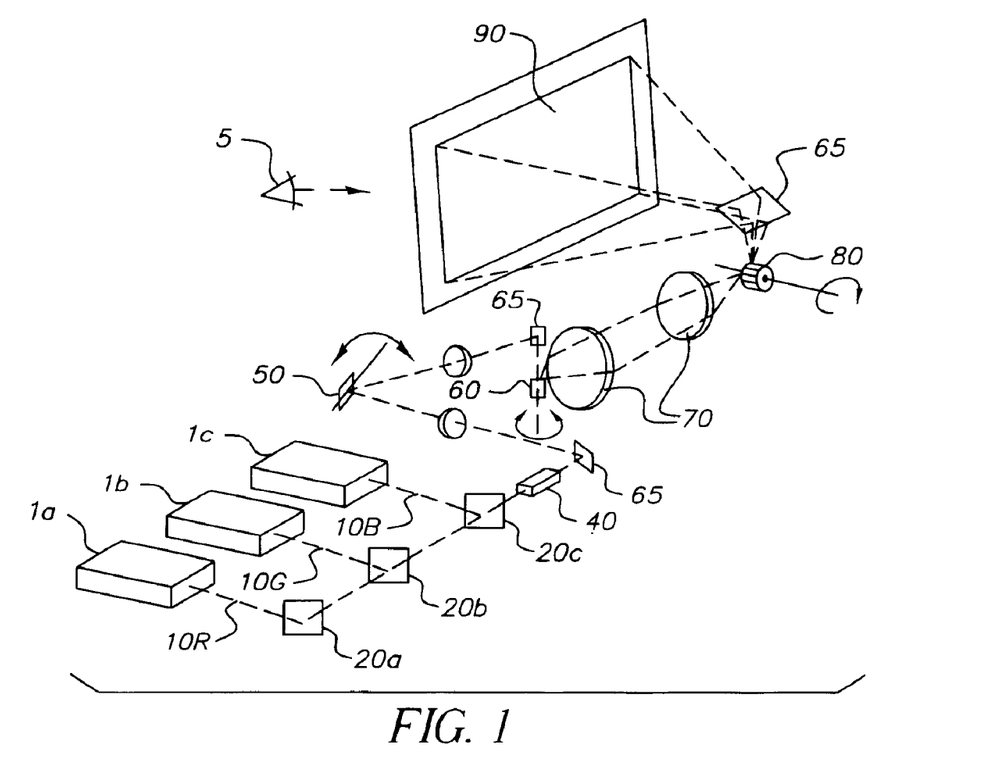
FIG. 1 illustrates a schematic diagram of a display system made in accordance with an embodiment of the present invention.

FIG. 1 illustrates a schematic view of a display system in which three separate laser devices are combined and illuminates a view screen 90 in a display that can be observed by a viewer 5. A red organic laser device 1a, a green organic laser device 1b, and a blue organic laser device 1c, produce three different optical wavelengths that when combined produce a color output. The construction of these laser devices is shown in more detail in FIG. 7. The way to modulate the intensity of the light from the organic laser devices is provided by the device itself through varying the pump-light intensity level. This modulation is accomplished by varying the electrical current supplied to the pump LED for the organic laser device. Because each wavelength's intensity can be independently controlled, both the brightness and color of the view screen 90 can be precisely controlled. In this way, a user viewable visible color image can be created on the view screen 90. The three light beams (10R, a red light beam, 10G, a green light beam, and 10B, a blue light beam,) are combined by the mirrors depicted as elements 20a, 20b, and 20c, respectively, to produce a single beam of light. Again, the brightness and color of this beam is controlled by the means sited above. Red light beam reflector 20a is optimized to reflect light of red wavelengths, while dichroic mirror 20b, transmits red light wavelengths and reflects green light wavelengths. Similarly, dichroic mirror 20c transmits red and green wavelengths, and reflects blue wavelengths. The production of such reflectors and dichroic mirrors is well known to those skilled in the art. An electrooptic deflector 40 can be used to modulate the position of the combined light beam and correct for unevenness in the pitch of the final raster beam on the view screen 90. As depicted in FIG. 1, elements 65 are optical mirrors of conventional design with broadband wavelength response. The combined beam is slightly deflected or "dithered" by wobble mirror 50 in order to reduce speckle in the final image when viewed on the view screen 90. The necessity for means to reduce the speckle is a consequence of the use of coherent laser light sources. Other alternative means to reduce the effects of speckle are known in the art including the use of a diffusing element in or near the view screen 90. The use and construction of such diffusing elements is well known to those versed in the art. One possible method for the construction of a diffusing element is to coat a beaded layer onto the view screen 90. If, for example, the view screen consists of a polyester support such as poly(ethylene terephthalate), then a thin coating of approximately 20 micrometer beads thick suffices to produce significant diffusion of the laser light. Such beads can be fabricated from polymers such as poly(methyl methacrylate-co-butyl acrylate), ethylene dimethacrylate, or hydroxyethyl methacrylate. Alternatively, roughened surfaces are known to diffuse the laser light; such surfaces can be produced by mechanical means such as stamping, etc. This combination of elements would create a display apparatus for receiving color laser light and having a diffusing element so that the display, in response to color laser light, produces a viewable visible colored image of high quality. Galvanometer mirror 60 deflects the combined beam in the horizontal direction. After passing through the additional optical components in the beam path, the motion of galvanometer mirror 60 causes vertical displacement of the light beam on the view screen 90. The combined laser light beam passes through an optical system, typically comprised of lenses 70, and illuminates a rotating polygon mirror 80. The mirror 80 projects color laser light from the array a line at a time onto the display in a pattern to cause a visual image to be produced by the display. This element causes the horizontal displacement of the combined light beam on the view screen 90. The optical and electronic components exclusive of the view screen 90 can be incorporated into an external projector system creating a front-projection display apparatus, or incorporated into a design where the view screen is illuminated from the rear.

Figure 2:
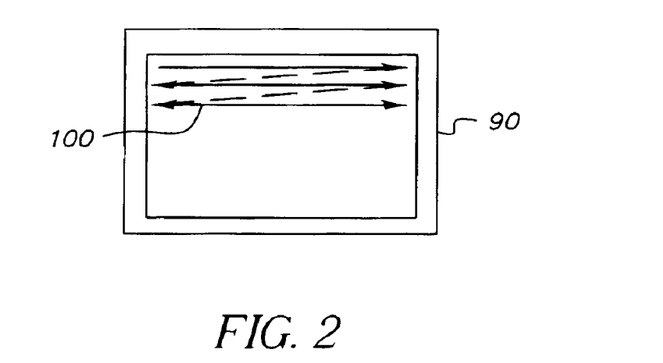
FIG. 2 illustrates raster scanning the mixed color light onto a view screen of the display of FIG. 1.

In FIG. 2, the laser beam path 100 on the view screen is depicted for the apparatus of FIG. 1. The light from the combined lasers is horizontally scanned from the upper left corner of the view screen 90 to the upper right corner. This motion of the light beam is depicted by the horizontal solid arrow in the figure. The light beam is then reset to the original horizontal position, but displaced vertically downward by the action of galvanometer mirror 60 to create the next line of the display. During this reset, the light beam is turned off by the direct reduction of the current to the organic laser devices. This event is depicted by the dotted line in the figure. Another horizontal scan then occurs. In this way, an image is built up for the viewer 5 in FIG. 1 on the view screen 90.

Figure 3:
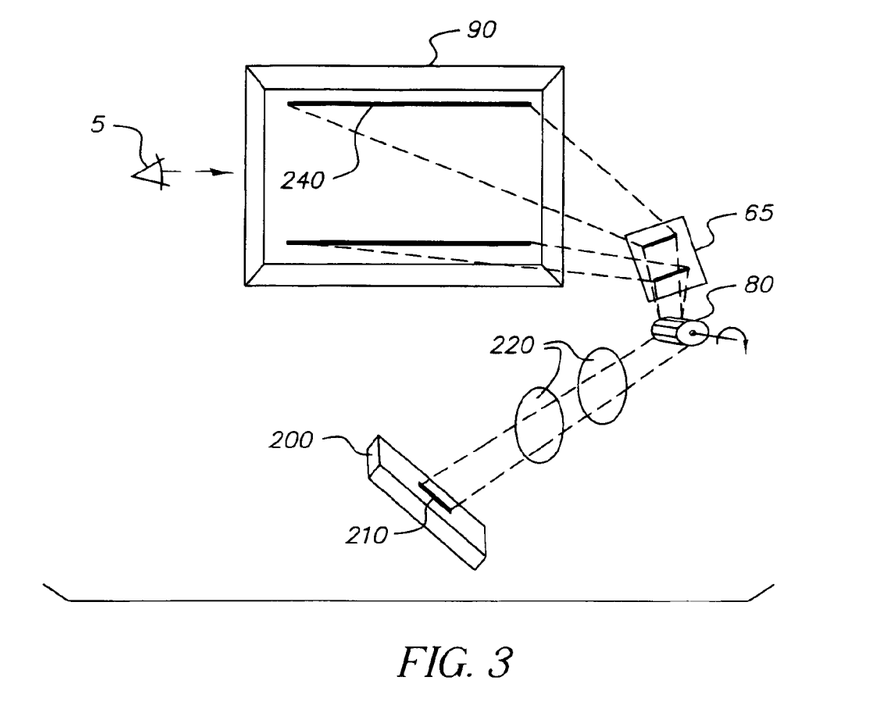
FIG. 3 illustrates a schematic view of a display system made in accordance with another embodiment of the present invention.

A method to reduce the cost, size, and complexity of such a display apparatus is depicted in FIG. 3. This figure illustrates a schematic view of a display system in which the laser light sources are integrated with appropriate drive electronics into an array. A plurality of different color laser light sources is arranged in an array with each such laser light source being independently controlled. A linear laser array 200 creates light from multiple independent organic microcavity lasers. In the example described here, three different color laser light sources are described, but there may be instances where to create a higher color gamut, light at more than three wavelengths may be produced. In FIG. 3 the line of activated laser array pixels 210 is depicted. This line source of light is produced by simultaneously electrically driving the independent microcavity organic laser light sources. The light is manipulated by optical system components 220 and imaged onto a rotating polygon mirror 80. The rotation of this mirror causes a vertical displacement of the image 240 of the line of activated laser array pixels on the view screen 90. Essentially an entire line is written to the view screen 90 simultaneously. The next line is written, vertically displaced from the first. The image is composed line-by-line at a rate where the viewer 5 perceives only the entire image. FIG. 3. depicts the case where the first and last lines of the image only are displayed. For this display apparatus, the need for optical and electronic components necessary for the precision movement of the combined light beam from FIG. 1 in the horizontal direction has been eliminated by the use of the linear laser array 200. The linear laser array 200 may be designed in such a manner to be easy removed and thus facilitate replacement in the event of a failure or the desire on the consumer's part for some improvement in the display capability, like increased resolution, additional color gamut, etc. The resolution of the display in this embodiment is determined by the scan resolution of the raster system for the vertical dimension and by the color laser pixel sizes of the laser array for the horizontal dimension.

Figure 4:
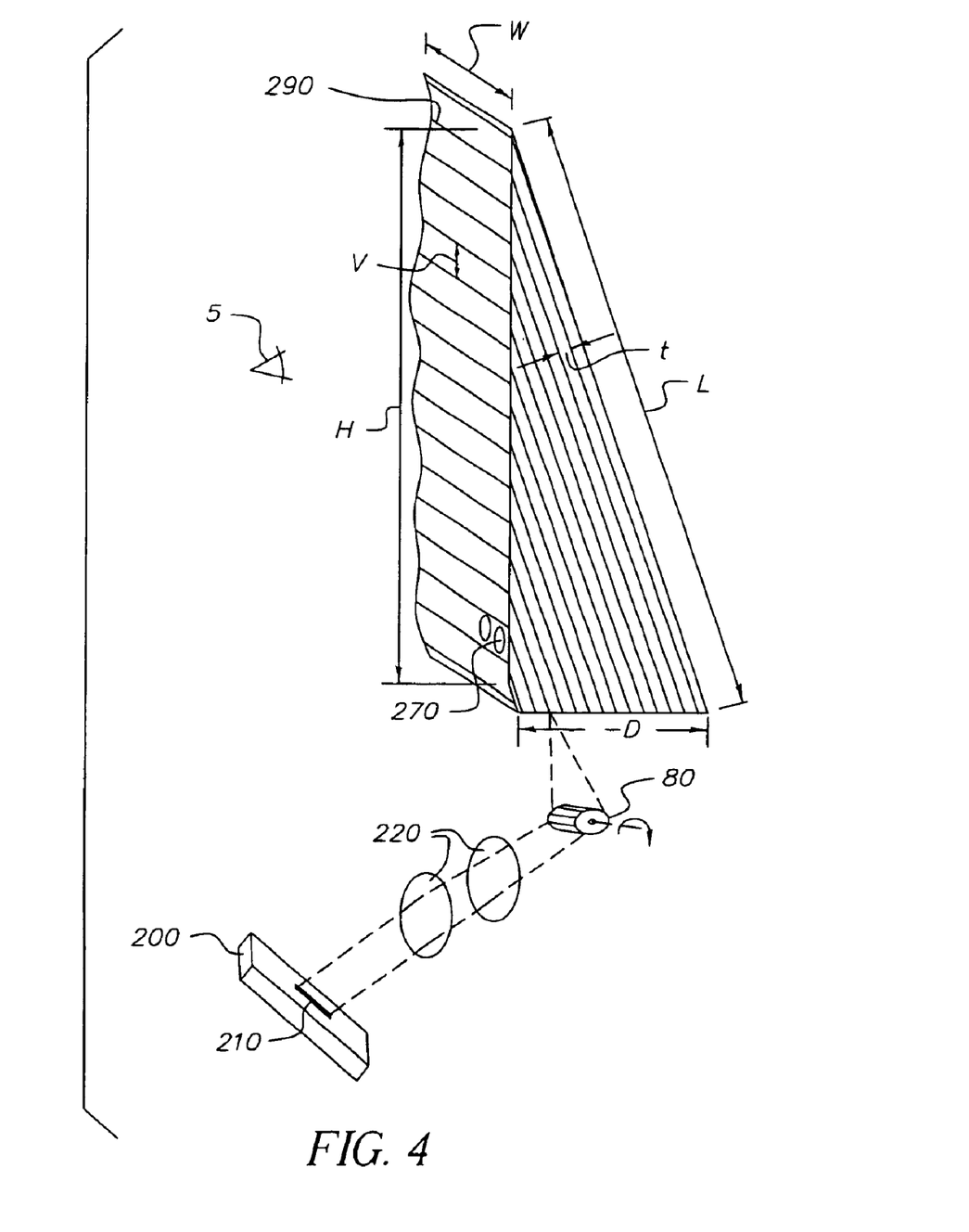
FIG. 4 illustrates a schematic view of an alternate display system made in accordance with another embodiment of the present invention, which uses a waveguide structure.

In FIG. 4 a schematic view of an alternate display system made in accordance the present invention is shown. The waveguide display component 290 in this display apparatus is more fully described in U.S. Pat. No. 5,381,502. In this patent, Veligdan discloses the use of a planar optical waveguide assembly and provides a detailed description of its operation. Similar to the embodiment described in FIG. 3, a linear laser array 200 creates light from multiple independent organic microcavity lasers. In the example described here, three different color laser light sources are described, but there may be instances where to create a higher color gamut, light at more than three wavelengths may be produced. In FIG. 4 the line of activated laser array pixels 210 is depicted. This line source of light is produced by simultaneously electrically driving the independent microcavity organic laser light sources. The light is manipulated by optical system components 220 and imaged onto a rotating polygon mirror 80. The rotating polygon mirror 80 directs the line of color laser light sources onto the bottom of waveguide display component 290. The waveguide display component 290 consists of layers of optically transparent material in which the index of refraction alternates between relatively high and low values. These layers of thickness t, serve to trap and guide the color laser light to the viewable portion of the assembly that has height H. The waveguide display component 290 effectively establishes a relationship between rows along the bottom of this component and viewable vertical rows of height V. Different vertical rows of the viewable portion of the assembly are addressed as the polygon mirror 80 rotates through its angular range and color laser light impinges onto the various planar waveguide layers corresponding to different distances along the bottom thickness D of the waveguide display component 290. FIG. 4 also depicts an image of laser array pixels 270 on the surface of the view screen 90. FIG. 4 shows a plurality of waveguides that comprise the waveguide display component 290 that direct light to the view screen 90. The layers of waveguide display component 290 serve to constrain the vertical extent of the image of the laser array pixels 270. In each waveguide, light from a particular color laser pixel is confined by total internal reflection. The horizontal extent of the image of the laser array pixels 270 is not constrained by the waveguide structure. The horizontal extent of this image is dictated by the amount of diffraction and size of the color laser pixels and also by effects such as scattering in the waveguide layer. Thus the resolution of the display in this embodiment is partly determined by the thickness of the layers t in the structure of the waveguide display component 290, and by the properties of the laser array.

Figure 5:
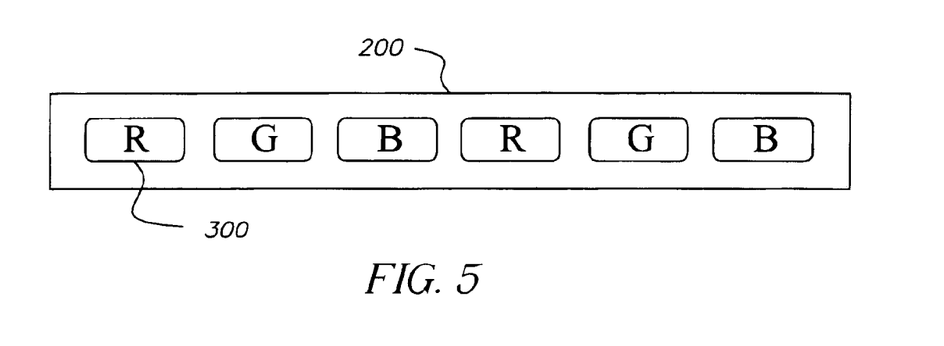
FIG. 5 is a schematic view of a linear laser array.

FIG. 5 is a schematic view of a linear laser array 200. In this case a plurality of different color laser light sources arranged in a linear array is shown. The pattern shown demonstrates repeating red (R), green (G), and blue (B) color laser devices. Each organic laser device 300 is an organic microcavity device. The patterning of these devices creates an integrated assembly of laser emitters for delivery of light to the view screen 90 of the display apparatus. Each super-pixel (combines a red, green, and blue pixel) viewed in the view screen 90 is defined by three laser light sources respectively producing red, green, and blue light.

Figure 6:
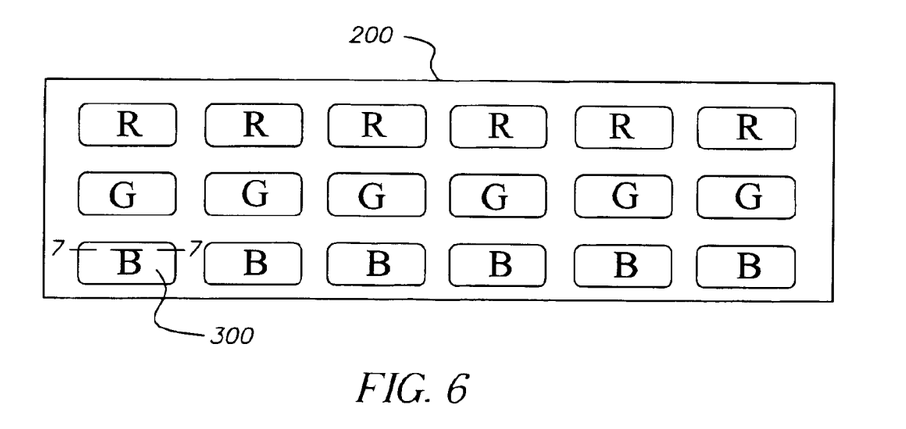
FIG. 6 illustrates a schematic view of another linear laser array.

FIG. 6 is a schematic view of an alternative linear laser array 200. In this case three linear arrays of laser emitters have been integrated into a single assembly. The array includes three separate linear arrays, with each linear array having a plurality of laser light sources producing the same color. Again, each organic laser device 300 is an organic microcavity device. Each pixel viewed in the view screen 90 is defined by three laser light sources respectively producing red, green, and blue light. In this case the three sources are vertically grouped. Clearly other spatial arrangements of the organic laser devices 300 are possible. The desired system characteristics of the display apparatus dictate the optimum spatial arrangement of these organic laser devices 300.

Figure 7:
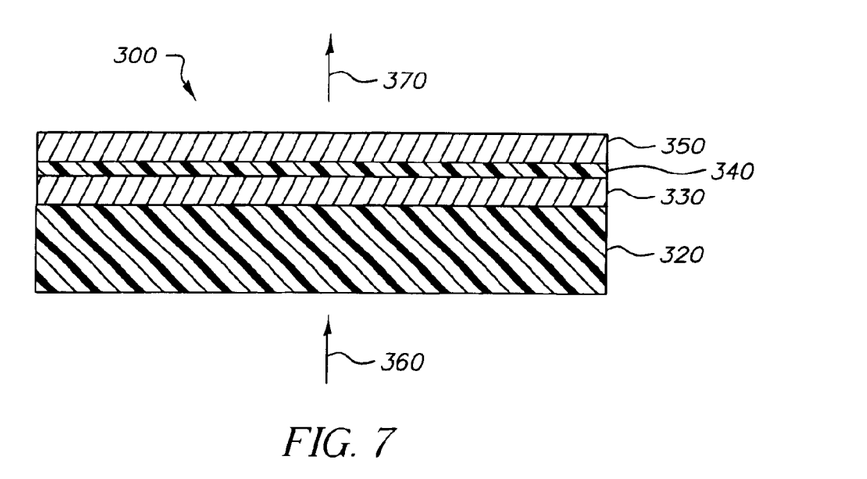
FIG. 7 illustrates a schematic view of a laser light source depicted in FIG. 1 and FIG. 7 and which is part of a laser array.

FIG. 7 illustrates a schematic view of a single organic laser device 300. FIG. 7 depicts a cross-sectional view of the organic laser device 300 along the line 7—7 in FIG. 6. It is an advantage of the present invention to use a vertical cavity design incorporating high reflectance dielectric multilayer mirrors for both the top and bottom reflectors and to have the active material composed of small molecule organic material. As a result the laser cavity has a very low threshold for laser action. This is a consequence of: 1) the small active volume; 2) the usage of very low-loss, high-reflectivity dielectric mirrors; 3) the lasing medium being composed of small molecule organic materials which can be deposited very uniformly over the bottom dielectric stack; and 4) the lasing medium being composed of a host organic material (absorbs the pump-beam radiation) and a small volume percentage dopant organic material (emits the laser light) which results in a high quantum efficiency and low scattering/absorption loss. The consequence of the very low threshold for the vertical cavity is that it is unnecessary to use high power density devices (focused laser light) in order to cause the cavity to lase. As a result, low power density devices, such as, unfocused organic light emitting diode (OLED) radiation or radiation from inorganic light emitting diodes (LEDs), are sufficient light sources to be used for pumping the laser cavities. Combining an organic-based laser microcavity with an LED pump source results in an inexpensive and versatile laser source whose light output can be tuned over a large wavelength range. This is especially critical for the production of high quality, high color gamut displays.

The substrate 320 can either be light transmissive or opaque, depending on the intended direction of optical pumping and laser emission. Light transmissive substrates 320 may be transparent glasses or plastics. Alternatively, opaque substrates including, but not limited to, semiconductor materials (e.g., silicon) or ceramic materials may be used in the case where both optical pumping and emission occur through the same surface. On the substrate is deposited a bottom dielectric stack 330 followed by an organic active region 340. A top dielectric stack 350 is then deposited. A pump-beam 360 optically pumps the vertical cavity organic laser device 300. The source of the pump-beam may be incoherent, such as, emission from an LED. Alternatively, the pump-beam may originate from a coherent laser source. The figure shows laser emission 370 from the top dielectric stack 350. Alternatively, the laser could be optically pumped through the top dielectric stack 350 with the laser emission through the substrate 320 by proper design of the dielectric stack reflectivities. In the case of an opaque substrate 320, such as silicon, both optical pumping and laser emission occur through the top dielectric stack 350.

The bottom and top dielectric stacks 330 and 350, respectively, are preferably deposited by conventional electron-beam deposition and are composed of alternating high index and low index dielectric materials, such as, $TiO_2$ and $SiO_2$, respectively. Other materials, such as $Ta_2O_5$ for the high index layers, could be used. The bottom dielectric stack 330 is deposited at a temperature of approximately 240° C. During the top dielectric stack 350 deposition process, the temperature is maintained at around 70° C. to avoid melting the organic active materials. In an alternative embodiment of the present invention, the top dielectric stack is replaced by the deposition of a reflective metal mirror layer. Typical metals are silver or aluminum, which have visible light reflectivities in excess of 90%. In this alternative embodiment, both the pump-beam 360 and the laser emission 370 would proceed through the substrate 320. Both the bottom dielectric stack 330 and the top dielectric stack 350 are reflective to laser light over a predetermined range of wavelengths. It has been found by experimentation that in order to obtain lasing peaks with full widths at half-maximum (FWHM) less than 1 nm, it is necessary to have the reflectances of both the top and bottom dielectric stacks be greater than 99% at the laser emission wavelength.

Figure 8:
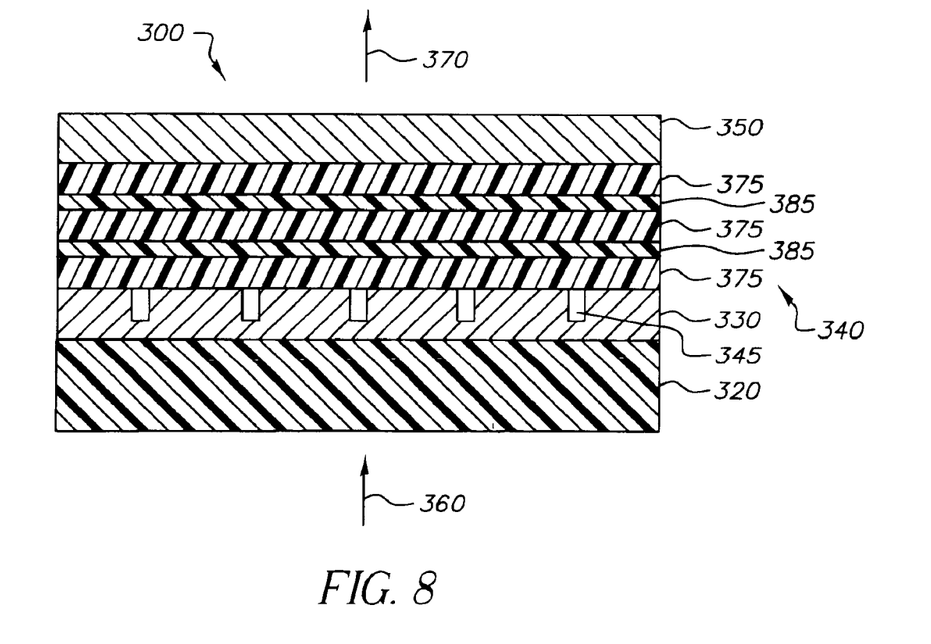
FIG. 8 displays a schematic view of an alternative design of the laser light source.

The operation of a vertical cavity design, incorporating high reflectance top and bottom dielectric stacks, can be improved by having the gain region(s) placed at the antinodes of the cavity's standing electromagnetic wavefield. As a result, the power conversion efficiency is improved, the lasing threshold is lowered, and unwanted output due to spontaneous emission is significantly reduced. FIG. 8 is a side view schematic of the vertical cavity organic laser device 300 with a more detailed view of the organic active region 340. The organic active region 340 includes one or more periodic gain regions 385 and organic spacer layers 375 disposed on either side of the periodic gain regions and arranged so that the periodic gain regions are aligned with the antinodes of the device's standing wave electromagnetic field. Since stimulated emission is highest at the antinodes and negligible at the nodes of the electromagnetic field, it is inherently advantageous to form the organic active region 340 as shown in FIG. 8. The placement of the gain region(s) is determined by using the standard matrix method of optics (Corzine et al. IEEE J. Quant. Electr. 25, 1513 [1989]). The spacer layers 375 do not undergo stimulated or spontaneous emission and largely do not absorb either the laser emission 370 or the pump-beam 360 wavelengths. An example of a spacer layer 375 is the organic material 1,1-Bis-(4-bis(4-methyl-phenyl)-amino-phenyl)-cyclohexane (TAPC). TAPC works well as the spacer material since it largely does not absorb either the laser output or the pump-beam and, in addition, its refractive index is slightly lower than that of most organic host materials. This refractive index difference is useful since it helps in maximizing the overlap between the electromagnetic field antinodes and the periodic gain region(s) 385. Employing periodic gain region(s) instead of a bulk gain region results in higher power conversion efficiencies, lowered lasing thresholds, and a significant reduction of the unwanted spontaneous emission.

The preferred material for the periodic gain region(s) 385 is a small molecular weight organic host-dopant combination typically deposited by high-vacuum thermal evaporation. These host-dopant combinations are advantageous since they result in very small unpumped scattering/absorption losses for the gain media. It is preferred that the organic molecules be of small molecular weight since thermally evaporated layers can be deposited more uniformly. The host materials used in the present invention are selected from any materials that have sufficient absorption at the pump-beam 360 wavelength and are able to transfer a large percentage of their excitation energy to the dopant material via Forster energy transfer. Those skilled in the art are familiar with the concept of Forster energy transfer, which involves a radiationless transfer of energy between the host and dopant molecules. An example of a useful host-dopant combination for red emitting layers is Alq [aluminum tris (8-hydroxyquinoline)] as the host material and 1% DCJTB [4-(dicyanomethylene)-2-t-butyl-6-(1,1,7,7-tetramethyljulolidyl-9-enyl)-4H-pyran] as the dopant. Other host-dopant combinations can be used for other wavelength emissions, such as in the green and blue parts of the visible spectrum. Other organic gain region materials can be polymeric substances, e.g., polyphenylenevinylene derivatives, dialkoxy-polyphenylenevinylenes, poly-para-phenylene derivatives, and polyfluorene derivatives, as taught by Wolk et al. in commonly assigned U.S. Pat. No. 6,194,119 B1 and references therein.

It is an advantage of the present invention to provide two-dimensional organic laser array devices employing micron-sized laser pixels which can be either electrically or optically-driven by large area sources and produce phase-locked laser output. The devices employ a microcavity design incorporating high reflectance dielectric stacks for both the top and bottom reflectors; and have a gain media including small molecular weight organic material. The micron-sized laser pixels of the device are created by modulating the reflectance of the bottom dielectric stack. The emission from the pixels is phase-locked which enables the device to be driven by a large area source while the laser output remains single mode (or at most a few lateral modes). Combining low power density thresholds with pumping by large area sources enables the devices to be optically-driven by inexpensive incoherent LED's. Because the light output from such pixels can be designed to be multi-mode (lateral), the coherence of the light source is reduced. Therefore the undesirable effects of speckle in the display are reduced as well. To obtain phase locking, intensity and phase information must be exchanged amongst the pixels. This is best obtained by weakly confining the laser emissions to the pixel regions by either small amounts of built-in index or gain guiding. As applied to two-dimensional inorganic laser arrays, a route for obtaining this weak confinement was to modulate the reflectance of the top dielectric stack by either adding metal (E. Kapon and M. Orenstein, U.S. Pat. No. 5,086,430) or by deep etching into the top dielectric stack (P. L. Gourley et al., Appl. Phys. Lett. 58, 890 [1991]). In both inorganic laser array cases, the laser pixels were on the order of 3–5 $\mu$m wide (so as to enable single mode action) and the inter-pixel spacing was 1–2 $\mu$m. Applying these results to organic laser systems requires some care since it is very difficult to perform micron-scale patterning on the laser structure once the organic layers have been deposited. As a result, in the preferred embodiment the reflectance modulation was affected by patterning and forming an etched region 345 in the bottom dielectric stack 330, using standard photolithographic and etching techniques, thus forming a two-dimensional array of circular pillars on the surface of the bottom dielectric stack. In the preferred embodiment the shape of the laser pixels was circular; however, other pixel shapes are possible, such as, rectangular. The inter-pixel spacing is in the range of 0.25 to 4 $\mu$m. Phase-locked array operation also occurs for larger inter-pixel spacings; however, it leads to inefficient usage of the optical-pumping energy. Following the inorganic lead and etching deeply into the bottom dielectric stack 330 in order to significantly lower the inter-pixel reflectivity is not a preferred route since it would lead to significant modulation of the active region position. A preferred method is to make a shallow etch from 50 to 400 nm deep to form etched region 345, and make use of the condition that lasing only occurs for wavelengths whose round-trip phase is an integer multiple of $2\pi$. As an example for red laser arrays, the lasing wavelength was chosen to be 660 nm. By removing odd multiples of layers (e.g., one $SiO_2$ layers or 2 $SiO_2$ layers and a $TiO_2$ layer) from the bottom dielectric stack 330, it was calculated (S. W. Corzine et al., IEEE J. Quant. Electron. 25, 1513 [1989]) that the lasing wavelength in the inter-pixel regions would be pushed as far as possible from 660 nm (~610 and 710 nm). In doing this it was found that the lasing and spontaneous emission signals in the 710 nm region are very small. Further, it was determined that by etching a few tens of nanometers deeper into the next $TiO_2$ layer, the short wavelength resonance condition would be pushed into the 590 nm wavelength region. In this wavelength region the dielectric stack reflectivity is significantly lower (which would impede any unwanted lasing) and the gain media's fluorescence strength is much reduced (which would impede any unwanted spontaneous emission). Hence, lasing action is prevented and spontaneous emission is significantly reduced in the inter-pixel regions by etching just beyond a couple of odd multiples of layers in the bottom dielectric stack 330.

The invention has been described in detail with particular reference to certain preferred embodiments thereof, but it will be understood that variations and modifications can be effected within the spirit and scope of the invention.

PARTS LIST 1a red organic laser device
1b green organic laser device
1c blue organic laser device
5 viewer
10B blue light beam
10G green light beam
10R red light beam
20a red light beam reflector
20b dichroic mirror
20c dichroic mirror
40 electrooptic deflector
50 wobble mirror
60 galvonometer mirror
65 optical mirrors
70 lenses
80 polygon mirror
90 view screen
100 laser beam path
200 linear laser array
210 activated laser array pixels
220 optical system components
240 image of the line of activated laser array pixels
270 image of laser array pixels on view screen
290 waveguide display component
300 organic laser device
320 substrate
330 bottom dielectric stack
340 organic active region
345 etched region
350 top dielectric stack
360 pump-beam
370 laser emission
375 organic spacer layer
385 periodic gain region

What is claimed is:

1. A display system for providing a user viewable visible color image, comprising:
   a) a display for receiving color laser light and having a diffusing element so that the display, in response to color laser light, produces a viewable visible colored image;
   b) a plurality of different color laser light sources arranged in an array with each such laser light source including a vertical cavity design having:
      i) a first dielectric stack for receiving and transmitting pump-beam light and being reflective to laser light over a predetermined range of wavelengths;

ii) an organic active region for receiving transmitted pump-beam light from the first dielectric stack; and iii) a second dielectric stack for reflecting transmitted pump-beam light and laser light from the organic active region back into the organic active region, wherein a combination of the first and second dielectric stacks and the organic active region produces the laser light;

c) an incoherent light source for directing light into the organic active region which in response to such incoherent light produces colored laser light; and d) means for projecting color laser light from the array onto the display in a pattern to cause a visual image to be produced by the display;

wherein each vertical cavity laser array further includes an etched region in the first dielectric stack to provide an array of spaced laser pixels which have higher reflectance than the interpixel regions.

2. The display system of claim 1 wherein the projecting means includes a moveable mirror which illuminates the display a line at a time with colored light pixels produced by the different light sources.

3. The display system of claim 2 wherein the moveable mirror is mounted on a polygon.

4. The display system of claim 1 wherein the array of different color laser light sources includes a plurality of pixels wherein each pixel is defined by three laser light sources respectively producing red, green, and blue light.

5. The display system of claim 1 wherein the array includes three separate linear arrays, each producing a different color with each array having a plurality of laser light sources producing the same color.

6. The display system of claim 1 further including a waveguide structure for receiving projected color light and directing it onto the display.

7. The display system of claim 1 wherein the display includes a view screen which permits a user to view the image.

8. The display system of claim 1 wherein the organic active region includes one or more periodic gain regions and organic spacer layers disposed on either side of the periodic gain regions and arranged so that the periodic gain regions are aligned with the antinodes of the light source's standing wave electromagnetic field.

* * * * *